(12) United States Patent
Fleizach et al.

(10) Patent No.: US 11,835,640 B2
(45) Date of Patent: Dec. 5, 2023

(54) EMITTER IDENTIFICATION THROUGH UNOBSERVED PARAMETERS

(71) Applicant: The United States of America, as represented by the Secretary of the Navy, San Diego, CA (US)

(72) Inventors: Gregory Knowles Fleizach, San Diego, CA (US); Christopher C. Pelham, Chula Vista, CA (US); Mark William Owen, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 490 days.

(21) Appl. No.: 17/236,016

(22) Filed: Apr. 21, 2021

(65) Prior Publication Data
US 2022/0342032 A1    Oct. 27, 2022

(51) Int. Cl.
*G01S 7/02*     (2006.01)
*G01S 13/00*    (2006.01)

(52) U.S. Cl.
CPC .............. *G01S 7/021* (2013.01); *G01S 7/027* (2021.05)

(58) Field of Classification Search
CPC .................................. G01S 7/021; G01S 7/027
See application file for complete search history.

(56) References Cited

U.S. PATENT DOCUMENTS

| | | | | |
|---|---|---|---|---|
| 4,025,920 A * | 5/1977 | Reitboeck | ............... | G01S 7/021 324/76.35 |
| 5,247,584 A * | 9/1993 | Krogmann | ............ | G01S 7/4802 382/156 |
| 5,263,097 A * | 11/1993 | Katz | ....................... | G01S 7/417 706/20 |
| 5,854,601 A * | 12/1998 | Kenefic | ................... | G01S 7/021 342/13 |
| 8,587,468 B2 * | 11/2013 | Card | ....................... | G01S 7/021 342/13 |
| 9,519,049 B1 * | 12/2016 | Kadambe | ................ | G01S 7/021 |
| 10,324,164 B1 | 6/2019 | Daly | | |
| 2008/0298514 A1 * | 12/2008 | Jones | ...................... | G01S 7/021 375/342 |

(Continued)

*Primary Examiner* — Bernarr E Gregory
(74) *Attorney, Agent, or Firm* — Naval Information Warfare Center Pacific; Kyle Eppele; James R. McGee

(57) ABSTRACT

An apparatus and method identify emitters. The apparatus includes a receiver, a parameter estimator, a database, and a correlator. The receiver receives an electromagnetic signal from an emitter and measures actual values of observed parameters of the electromagnetic signal. The parameter estimator surmises surmised values of unobserved parameters from the actual values of the observed parameters. The actual values of the observed parameters and the surmised values of the unobserved parameters characterize the emitter. The database stores one or more entries for each emitter. Each entry specifies an identifier of an emitter and exemplary values of the observed and unobserved parameters. The correlator matches the actual values of the observed parameters and the surmised values of the unobserved parameters with the exemplary values of one of the entries of the emitter from which the receiver receives the electromagnetic signal. The correlator outputs the identifier from this entry in the database.

20 Claims, 3 Drawing Sheets

(56) References Cited

U.S. PATENT DOCUMENTS

2019/0162818 A1\* 5/2019 Grandin ................ G01S 7/021
2019/0332918 A1\* 10/2019 Gómez Gutiérrez ........................
G05B 13/048

\* cited by examiner

EMITTER IDENTIFICATION THROUGH UNOBSERVED PARAMETERS

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, CA, 92152; voice (619) 553-5118; ssc_pac_t2@navy.mil. Reference Navy Case Number 108126.

BACKGROUND OF THE INVENTION

Signal emitters transmit signals with characteristics that vary over time depending upon the current configurations of the signal emitters. However, there is a general need to identify signal emitters from their transmitted signals despite the varying characteristics of the transmitted signals.

SUMMARY

An apparatus for identifying emitters includes a receiver, a parameter estimator, a database, and a correlator. The receiver receives an electromagnetic signal from an emitter and measures actual values of observed parameters of the electromagnetic signal. The parameter estimator surmises surmised values of unobserved parameters from the actual values of the observed parameters of the electromagnetic signal. The actual values of the observed parameters and the surmised values of the unobserved parameters characterize the emitter. The database stores one or more entries for each emitter. Each entry specifies an identifier of an emitter and specifies exemplary values of the observed and unobserved parameters that characterize the emitter. The correlator matches the actual values of the observed parameters and the surmised values of the unobserved parameters with the exemplary values of one of the entries of the emitter from which the receiver receives the electromagnetic signal. The correlator outputs the identifier from this entry in the database.

A method identifies emitters. An electromagnetic signal is received from an emitter. Actual values of observed parameters are measured from the electromagnetic signal. Surmised values of unobserved parameters are surmised from the actual values of the observed parameters. The actual values of the observed parameters and the surmised values of the unobserved parameters characterize the emitter. Stored in a database are one or more entries for each emitter. Each of the entries specifies an identifier of an emitter and exemplary values of the observed and unobserved parameters that characterize the emitter. The actual values of the observed parameters and the surmised values of the unobserved parameters are matched with the exemplary values of one of the entries of the emitter from which the electromagnetic signal is received. The identifier is output from this entry in the database.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Disclosed in each embodiment are an apparatus or a method for identifying emitters of electromagnetic signals that identify the emitters from their emitted electromagnetic signals despite certain varying characteristics of these electromagnetic signals.

Figure 1:
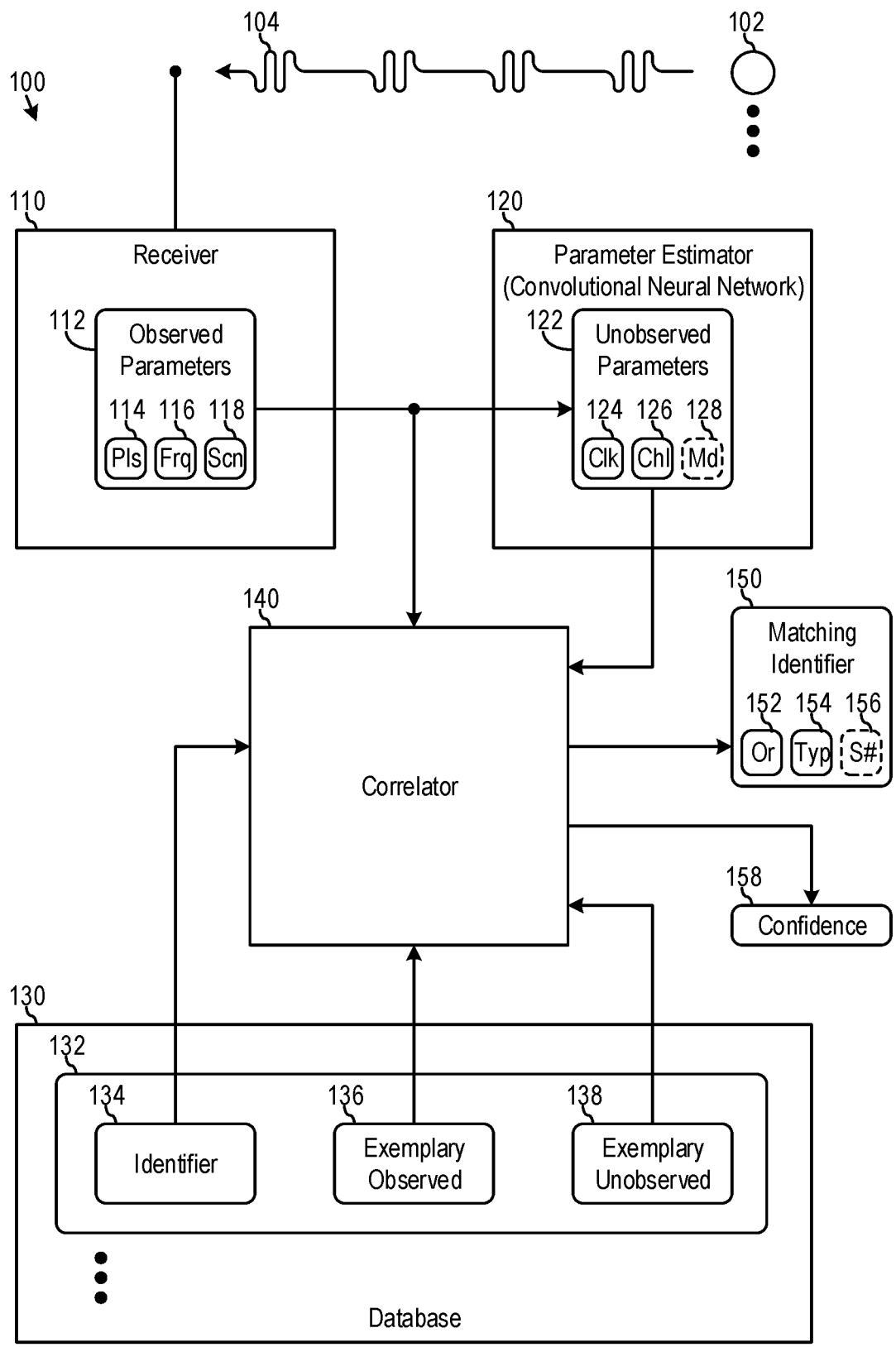
FIG. 1 is a block diagram of an apparatus for identifying emitters in accordance with an embodiment of the invention.

FIG. 1 is a block diagram of an apparatus 100 for identifying emitters in accordance with an embodiment of the invention. The emitters include a particular emitter 102.

A receiver 110 of the apparatus 100 receives an electromagnetic signal 104 from the emitter 102. The receiver 110 directly measures respective actual values of observed parameters 112 of the electromagnetic signal 104. Examples of observed parameters 112 include a pulse repetition interval 114 of the electromagnetic signal 104, a pulse width of the electromagnetic signal 104, a frequency 116 of the electromagnetic signal 104, and a scan period 118 of the electromagnetic signal 104. In one embodiment, the receiver 110 is means for receiving an electromagnetic signal 104 from an emitter 102.

In one embodiment, the emitter 102 is a radar emitter with a rotating antenna, which emits the electromagnetic signal 104 that is a radio frequency signal containing radar pulses. The pulse repetition interval 114 observed at receiver 110 is a time between the leading edge of each radar pulse and the leading edge of the next radar pulse, the pulse width is a time between the leading edge and the trailing edge of each radar pulse, and the frequency 116 is a radio frequency of the radio frequency signal. The scan period 118 is a time for a complete azimuthal rotation of the rotating antenna, such that a receiver 110, which is moderately distant from emitter 102, observes clusters of a few quickly successive radar pulses separated by quiet intervals corresponding to the scan period 118.

The pulse repetition interval 114 can vary from pulse to pulse in a repeating sequence. For example, emitter 102 includes a pseudo-random sequence generator, and values from the pseudo-random sequence specify many different values for the intervals between pulses, before the pseudo-random sequence repeats during each azimuthal scan. Additionally, the emitter 102 can have various modes, so that after a mode change the pulse repetition interval 114 and scan period 118 appear wholly unrelated to those previously observed. For example, emitter 102 has a high-resolution mode using a short pulse repetition interval 114 and a long scan period 118 for resolving nearby targets, and a low-resolution mode using a long pulse repetition interval 114 and a short scan period 118 for detecting distant targets. Thus, from the observed parameters 112, emitter 102 might appear to be a completely different emitter after a mode change.

Typically, an emitter 102 operates within a particular radio frequency band. However, many emitters change their frequency from pulse to pulse or from scan to scan. Additionally, some emitters sense other nearby emitters and shift their frequency to avoid interference. A frequency shift is enough to make identification methods in the related art declare an electromagnetic signal 104 as unidentifiable against a database of known emitters.

Thus, the observed parameters 112 of an emitter 102 are highly variable and any attempt to match the electromagnetic signal 104 of an emitter 102 based solely on the observed parameters 112 is prone to confusion and ambiguity. Embodiments of the invention match emitters based on static unobserved parameters 122 instead of the fluid observed parameters 112 that are easily (and commonly) changed by simple reprogramming of an emitter 102.

A parameter estimator 120 surmises, from the actual values of the observed parameters 112 of the electromagnetic signal 104, surmised values of unobserved parameters 122. Together, the actual values of the observed parameters 112 and the surmised values of the unobserved parameters 122 characterize the emitter 102. Examples of unobserved parameters 122 include clock characteristics 124, channel characteristics 126, and optionally an operating mode 128 for the emitter 102 of the electromagnetic signal 104. The clock characteristics 124 include a period of at least one clock of the emitter 102 of the electromagnetic signal 104, a set of countdowns for the clock of the emitter 102 of the electromagnetic signal 104, and a crystal frequency for generating the clock of the emitter 102 of the electromagnetic signal 104. The channel characteristics 126 include a channel spacing and a set of channel multipliers of the electromagnetic signal 104.

In one embodiment, the parameter estimator 120 is the Systems and Methods for Radar Characterization and Model Formation of U.S. Pat. No. 10,324,164, which is incorporated by reference in its entirety for all purposes. In essence, the parameter estimator 120 of U.S. Pat. No. 10,324,164 relies the reality that usually a single crystal oscillator derives all the timing functions of the emitter 102.

For example, temporal values of pulse repetition interval 114 of emitter 102 are generated by multiplying a clock period by integer countdowns according to the equation:

$$PRI_i = clock_k \times countdown_i$$

where $PRI_i$ is the pulse repetition interval between the leading edges of pulses i and i+1 generated by multiplying the period of current clock k by countdown i in a sequence, with the values of countdown i in the sequence drawn from a set of integer countdowns. A single emitter 102 may utilize multiple clocks to generate different sequences of the pulse repetition interval. Often, the set of integer countdowns stays the same even when the mode, and hence the clock, changes. Additionally, the crystal frequency can be estimated for an emitter 102 that creates a number of clocks from a single crystal oscillator multiplied by the integer value of the current mode according to the equation:

$$clock_k = crystal \times mode_k$$

where $clock_k$ is the period of the current clock k generated by multiplying the inverse of the crystal frequency by the integer value of the current mode k. To reiterate, these clocks are themselves multiplied by integer countdowns to generate the actual values of pulse repetition interval 114 of the observed parameters 112.

In this example, the actual temporal values of pulse repetition interval 114 are some of the observed parameters 112 measured by the apparatus 100, while the surmised values of the periods of the clocks, the set of integer countdowns, and the crystal frequency of the clock characteristics 124 and the surmised values of the operating mode 128 are some of the unobserved hardware/software parameters 122 that underlie what is directly measured by the apparatus 100 for identifying emitters. The parameter estimator 120 extracts the surmised values of the clock characteristics 124 from the basic relationships given in the above equations relating the actual temporal values of the pulse repetition interval 114 to the surmised values of the clock characteristics 124 of the unobserved parameters 122.

Similarly, the parameter estimator 120 surmises, from the actual values measured for the frequency 116 of the electromagnetic signal 104, the surmised values of the channel characteristics 126, including surmised values of a channel spacing and a set of channel multipliers of the electromagnetic signal 104. Specifically, the estimated channel spacing multiplied by the spacing multipliers reproduces the frequency 116 that the receiver 110 measures in the observed parameters 112. Due to a variety of factors, the actual values measured for the frequency 116 of the electromagnetic signal 104 may appear to be different from between encounters of a particular emitter 102, but the underlying channel spacing and channel multipliers are governed by static physical mechanisms in emitter 102 that generate the frequency 116 of the electromagnetic signal 104.

Again, the parameter estimator 120 surmises, from the actual values of the observed parameters 112 of the electromagnetic signal 104, the surmised values of unobserved parameters 122. Due to the physical mechanisms in emitter 102, the actual values of the observed parameters 112 are typically generated according to specific rules from unobserved parameters 122 that cannot be directly observed. Estimating these latent unobserved parameters 122 yields a new dimension for identifying emitters.

In summary for the embodiment described above, the parameter estimator 120 is the Systems and Methods for Radar Characterization and Model Formation of U.S. Pat. No. 10,324,164, which is incorporated by reference in its entirety for all purposes. In addition for this embodiment or instead in another embodiment, the parameter estimator 120 is a machine learning system, such as a convolutional neural network. In these embodiments, the parameter estimator 120 is the means for surmising the surmised values of the unobserved parameters 122 from the actual values of the observed parameters 112 of the electromagnetic signal 104.

The database 130 stores an entry 132, or multiples entries, for emitter 102 when the emitter 102 has been previously encountered either indirectly or directly by apparatus 100. The database 130 stores similar entries for other emitters. The entry 132 specifies an identifier 134 of the emitter 102 and specifies exemplary values 136 of the observed parameters and exemplary values 138 of the unobserved parameters that characterize the emitter 102. In one embodiment, the database 130 is means for storing one or more entries for each of the emitters.

The correlator 140 matches the actual values of the observed parameters 112 and the surmised values of the unobserved parameters 122 with the exemplary values 136 and 138 of a matching entry 132 in database 130. The correlator 140 outputs the identifier 134 from the matching entry 132 as the identifier 150 of the emitter 102 from which the receiver 110 receives the electromagnetic signal 104. In one embodiment, the identifier 150 specifies a manufacturing origin 152, a model type 154, and optionally a serial number 156 of the emitter 102. For example, emitters with the same manufacturing origin 152 and a model type 154 usually have the same nominal frequency for the crystal frequency of clock characteristics 124, but measurements taken over an interval of several seconds might be sufficient to measure individual differences from the nominal frequency, thereby yielding a serial number 156 of the emitter 102. Typically, the correlator 140 also outputs a confidence score 158 that specifies a likelihood that the identifier 150 properly identified the emitter 102.

In one embodiment, the correlator 140 is means for matching the respective actual values of the observed parameters 112 and the respective surmised values of the unobserved parameters 122 with the exemplary values 136 and 138 of an entry 132 in the database 130 for the emitter 102 of the electromagnetic signal 104.

In one embodiment, the correlator 140 initially matches the surmised values of the unobserved parameters 122 with the exemplary values 138 of one or more candidates from the entries in the database 130. The correlator 140 then matches the actual values of the observed parameters 112 with the exemplary values 136 of one of the candidates for the emitter 102 from which the receiver 110 receives the electromagnetic signal 104. This matching unobserved parameters 122 before matching observed parameters 112 simplifies computational effort and gives greater matching weight to the unobserved parameters 122 that are more likely to uniquely characterize the emitter 102 emitting the electromagnetic signal 104. If the observed parameters 112 clearly match, but the unobserved parameters 122 match less clearly, this may indicate the same manufacturing origin 152, but not the same model type 154.

The confidence score 158 gives relatively more weight to a degree of the matching of the unobserved parameters 122 and relatively less weight to a degree of the matching of the observed parameters 112 because the observed parameters 112 generally contain measurement noise that is averaged out in unobserved parameters 122. Furthermore, weights can vary within the observed and unobserved parameters 112 and 122. For example, the crystal frequency of clock characteristics 124 might usually distinguish emitters and hence be given greater weight than the less unique countdowns of clock characteristics 124. The confidence 158 reflects any partial match for the observed and unobserved parameters 112 and 122. For example, the exemplary values 138 for the countdowns contains the set of integer countdowns {150, 151, 154, 155}, while the actual values for the countdowns of clock characteristics 124 of the unobserved parameters 122 contains the set of integer countdowns {150, 151}. The overlap between these sets and the inclusion of the set of countdowns {150, 151} within the upper and lower limits of the set of countdowns {150, 151, 154, 155} indicates a partial match. This is a good indication that emitter 102 is identified by the identifier 134 of this partly matching entry 132 in the database 130, but perhaps indicates an operating mode 128 not previously encountered from the emitter 102.

The weighted contributions of matching the unobserved and observed parameters 112 and 122 with the exemplary values 136 and 138 in the database 130 are summed to generate the single confidence score 158, which indicates the confidence that the identifier 134 of the entry 132 properly identifies the emitter. A typical range for confidence score 158 is [0,1] where 0 would indicate absolutely no match, 1 would indicate a perfect match, and 0.5 would indicate that emitter 102 partially matches entry 132 in the database 130, but identifier 134 does not confidently identify emitter 102.

Figure 2:
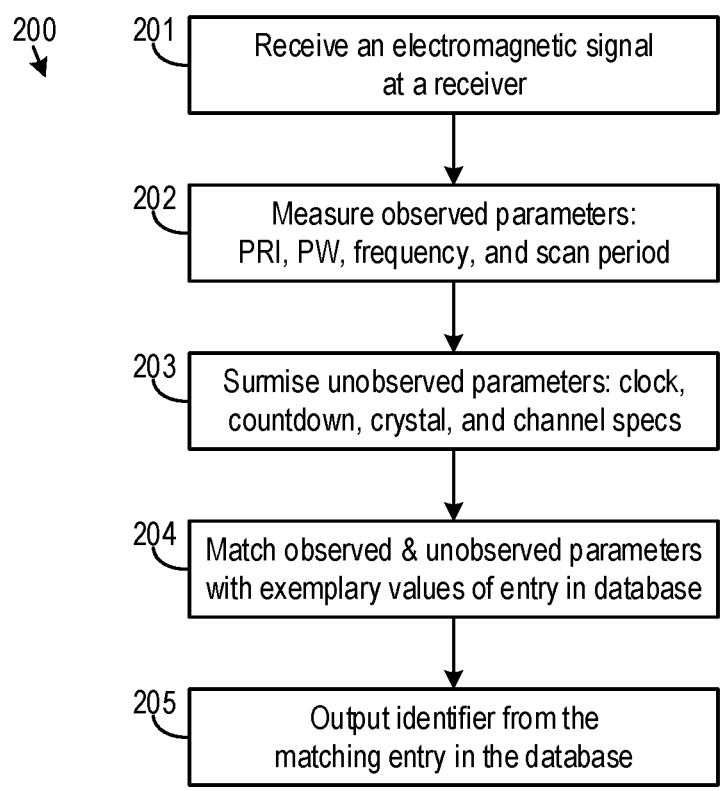
FIG. 2 and FIG. 3 are flow diagrams of a process for identifying emitters in accordance with an embodiment of the invention.

FIG. 2 is a flow diagram of a process 200 for identifying emitters in accordance with an embodiment of the invention.

At step 201, an electromagnetic signal is received from an emitter. At step 202, respective actual values are measured for observed parameters of the electromagnetic signal.

At step 203, respective surmised values of unobserved parameters are surmised from the respective actual values of the observed parameters of the electromagnetic signal. Together, the respective actual values of the observed parameters and the respective surmised values of the unobserved parameters characterize the emitter.

At step 204, the respective actual values of the observed parameters and the respective surmised values of the unobserved parameters are matched with the exemplary values of a matching one of the entries in a database. The database stores one or more entries for each emitter in the database. Each entry specifies an identifier of an emitter and specifies exemplary values of the observed and unobserved parameters that characterize the emitter. The matching entry from the database identifies the emitter from which the electromagnetic signal is received during step 201.

At step 205, the identifier is output from the matching entry in the database.

Figure 3:
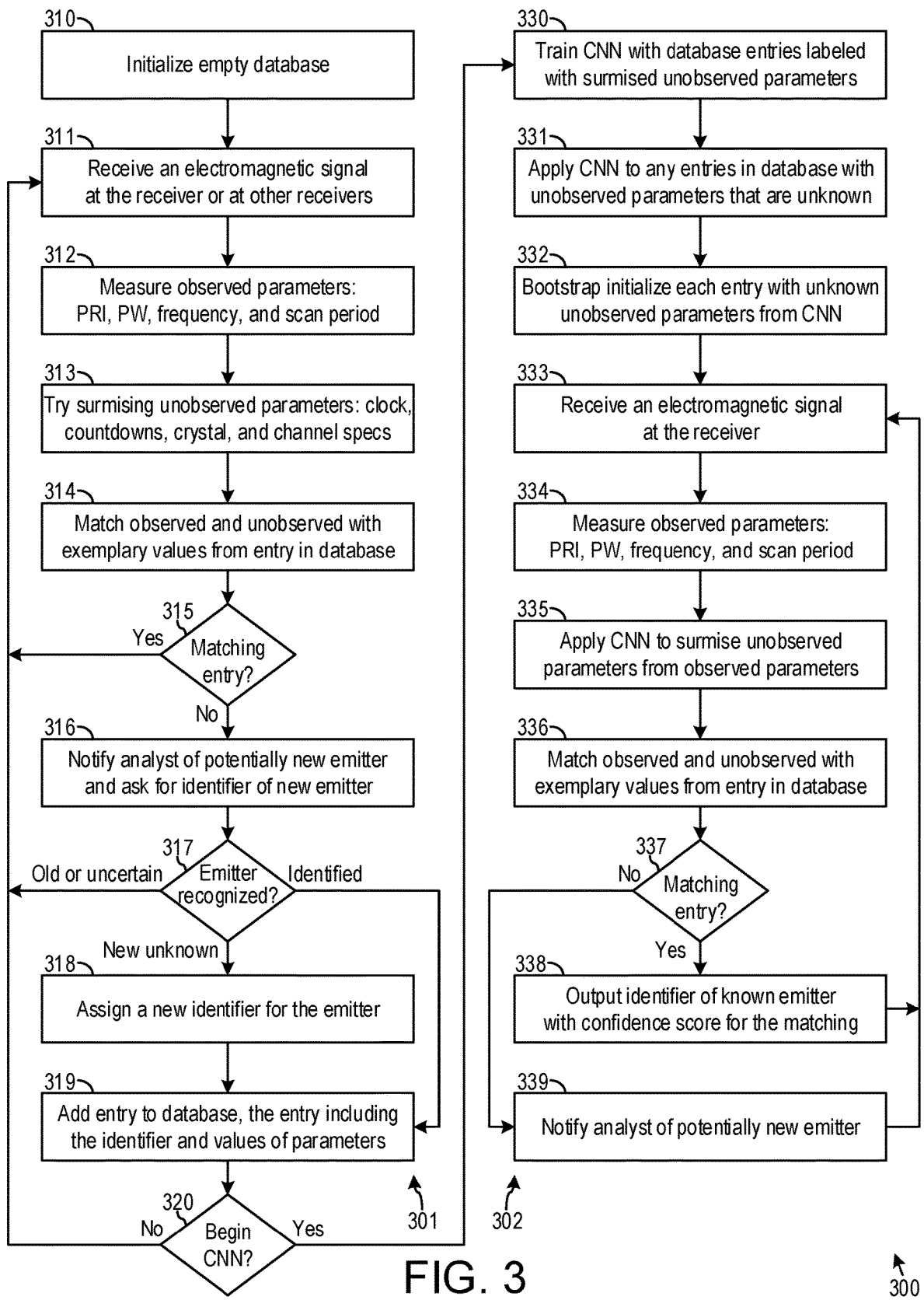

FIG. 3 is a flow diagram of an ongoing process 300 for identifying emitters in accordance with an embodiment of the invention. At certain steps, the process 300 consults with an analyst having expertise in identifying emitters.

At step 310, database is initialized to an empty database. First column 301 of process 300 initializes the entries in the database, and second column 302 of process 300 indirectly utilizes the database for identifying emitters.

At step 311, an electromagnetic signal is received at the same receiver subsequently receiving an electromagnetic signal needing identification, or at other receivers. The electromagnetic signal is received either in real-time or is drawn from a historical collection of received electromagnetic signal. In one example, there are multiple instances of the apparatus for identifying emitters, and the collectively received electromagnetic signals are periodically shared between them. The received electromagnetic signal is typically collected over a significant amount of time, such as minutes of tracking a moving emitter or minutes during an interval when a mobile emitter remains at a static location. The received electromagnetic signal might be collected over disjoint time intervals linked by similar observable parameters or otherwise linked together, such as through visual identification of the emitter.

At step 312, observed parameters are measured in the received electromagnetic signal. Typically, this includes measuring the pulse repetition interval between pulses in the received electromagnetic signal, the pulse width of the pulses, the frequency of the received electromagnetic signal, and a scan period between clusters of the pulses.

At step 313, the unobserved parameters are surmised, if possible, from the observed parameters received and measured at steps 311 and 312. For example, the unobserved parameters are surmised by the parameter estimator disclosed in Systems and Methods for Radar Characterization and Model Formation of U.S. Pat. No. 10,324,164, which is incorporated by reference in its entirety for all purposes.

At step 314, the observed parameters and any successfully surmised unobserved parameters are matched with exemplary values of the observed and unobserved parameters of an entry in a database. Of course, no match is found when the database remains empty after its initialization at step 310. Typically, when the attempt at surmising unobserved parameters at step 313 is unsuccessful, no unique match is found at step 314. Decision 315 checks whether a matching entry was found in the database. If a unique matching entry is found with a confidence score exceeding a threshold, then the database already contains an appropriate entry for the emitter emitting the electromagnetic signal received at step 311, and process 300 returns to step 311 to receive another electromagnetic signal from the same or another emitter. If a unique match is not found, process 300 proceeds to step 316.

At step 316, an analyst is notified of the potentially new emitter not in the database, or not uniquely identified in the database. Process 300 presents to the analyst the observed parameters and any successfully surmised unobserved parameters, and the closest matching entries in the database along with their confidence scores. The expert analyst identifies the appropriate emitter, if possible. Decision 317 check three possible outcomes from consulting the analyst. First, the database already includes an appropriate entry for a known emitter or the identity of the emitter is uncertain from the available information, and process 300 returns to step 311 to avoid polluting the database with duplicate or indefinite entries. Second, the analyst positively identifies the identity of the emitter as a new emitter not in the database, and process 300 proceeds to step 319. Third, the analyst identifies the emitter as a new emitter not in the database, but with an unknown identity, and process 300 proceeds to step 318.

At step 318, an identifier is assigned to the new emitter. For example, an index number is assigned and then incremented. Subsequently, when the analyst is again consulted at step 316 or 339, the analyst might update this assigned identity with additional information, such as a manufacturing origin, a model type, and a serial number of the emitter. At step 319, an entry is added to the database. The entry includes the identifier and exemplary values of the observed parameters. Typically the entry also includes exemplary values of the unobserved parameters; however, occasionally an emitter is identified even though attempt at surmising unobserved parameters at step 313 is unsuccessful, and then an entry is added to the database with exemplary values of the observed parameters, but without exemplary values of the unobserved parameters.

Decision 320 checks whether building the initial database is complete. If so, process 300 proceeds to step 330; otherwise, process 300 returns to step 311. The initial database is complete after respective representative signals are received from enough emitters and the parameter estimator of step 313 has sequentially initialized the database from the respective representative signals for the emitters.

At step 330, a convolutional neural network is trained to deduce surmised values of the unobserved parameters from the actual values of the observed parameters. After such training, the convolutional neural network becomes a parameter estimator that generates the surmised values of the unobserved parameters from the actual values of the observed parameters of an electromagnetic signal subsequently received.

Training the convolutional neural network to input observed parameters and output unobserved parameters requires training data that is labeled with the expected values of the unobserved parameters for a variety of provided values of the observed parameters. The database created in first column 301 of process 300 provides this training data because most, but perhaps not all, of the entries in the database include surmised values of the unobserved parameters extracted from the actual values of the observed parameters. The labeled training data from the database includes, for each emitter, observed values of the observed parameters labeled with unobserved values of the unobserved parameters, with the observed values of the observed parameters measured from a representative signal emitted from the emitter, and the unobserved values for the unobserved parameters for the emitter extracted from basic relationships among the observed values of the observed parameters and the unobserved values for the unobserved parameters. Thus, the database includes a variety of actual values of the observed parameters paired with surmised values of the unobserved parameters. In summary, the convolutional neural network undergoes supervised training with those entries in the database already having surmised unobserved parameters.

Previous approaches, including those of U.S. Pat. No. 10,324,164, rely on a known simplistic relationship between the observed and unobserved parameters. However, the power of machine learning in general and convolutional neural networks in particular is deducing relationships between the inputs and outputs not easily seen by a human analyst. For example, the inputs and outputs (i.e. observed parameters and unobserved parameters, respectively) might be related by some multi-term polynomial function or even a non-linear function that would be exceedingly difficult for a human analyst to deduce. Even when simple equations relate the observed input parameters to the unobserved output parameters, after training with the database, the convolutional neural network may develop its own understanding of this relationship. With adequate labeled training examples, however, a convolutional neural network can infer complex relationships.

When presented with the actual values of the observed parameters from an unknown emitter, the trained convolutional neural network can make an informed estimate of what the unobserved parameters would have to be to satisfy the learned relationships. This provides a closest match interpolation of an unknown emitter among similar known emitters, to determine the hardware/software unobserved parameters of each emitter not previously encountered. So while previous approaches relied on a simplistic relationship to estimate the unobserved parameters, a machine learning approach potentially leverages multiple non-obvious relationships between the input and output parameters. Even when the amount of observed parameters would make it difficult for previous approaches to accurately estimate unobserved parameters (e.g. only a few actual values of the pulse repetition interval), a convolutional neural network can generate a good estimate by synthesizing all the available information.

Some entries in the database may omit surmised values of the unobserved parameters. For example, when the emitter is successfully identified from the observed parameters even though the attempt at surmising unobserved parameters at step 313 is unsuccessful, an entry is added to the database with unspecified values of the unobserved parameters. However, the trained convolutional neural network can generally deduce these unknown values of the unobserved parameters. Thus, at step 331, the convolutional neural network is applied to any entries in the database that have unknown values for the unobserved parameters, and, at step 332, the unknown values for the unobserved parameters in these entries are updated with the exemplary values deduced by the convolutional neural network. It will be appreciated that instead of updating entries in the same database, in another embodiment a new database is created and used in the subsequent steps of process 300. Thus, after step 332 each entry in the database contains a template model of exemplary values for the observed parameters and unobserved parameters.

Thus, the database initially stores an entry that is partially defined, because although the entry specifies an identifier of an emitter and detected values of the observed parameters, the entry does not initially specify impending values of the unobserved parameters. However, the machine learning system of the parameter estimator surmises the impending values of the unobserved parameters from the detected values of the observed parameters at step 331, and the partially defined entry of the database is initialized at step 332 with the impending values surmised by the machine learning system.

With the database fully initialized, the process 300 begins a real-time loop of receiving electromagnetic signals and identifying each electromagnetic signal by matching the observed parameters of the electromagnetic signal with the template models in the database.

At step 333, an electromagnetic signal is received at the receiver. At step 334, observed parameters are measured in the received electromagnetic signal. In one embodiment, this includes measuring the pulse repetition interval between pulses in the received electromagnetic signal, the pulse width of the pulses, the frequency of the received electromagnetic signal, and a scan period between clusters of the pulses. At step 335, the convolutional neural network is applied to the observed parameters to deduce the unobserved parameters.

At step 336, the observed parameters and the surmised unobserved parameters from the convolutional neural network are matched with exemplary values of the observed and unobserved parameters of an entry in a database. This database search also yields a confidence score indicating a likelihood that the emitter is properly identified.

Step 333 and step 311 are similar and correspond to step 201 in FIG. 2. A difference between steps 333 and 311 is typically step 311 receives electromagnetic signals at many receivers to build the initial database in the first column 301 of process 300, and then the database is first updated at step 332 and then copied to each receiver as a local database before step 333 receives an electromagnetic signal needing identification at a particular receiver. However, in another embodiment, a global database supports networked queries at step 336.

Step 334 and step 312 are similar and correspond to step 202 in FIG. 2.

Step 335 and step 313 are similar and correspond to step 203 in FIG. 2. A difference between steps 335 and 313 is typically step 313 surmises the unobserved parameters from the observed parameters using the parameter estimator disclosed in Systems and Methods for Radar Characterization and Model Formation of U.S. Pat. No. 10,324,164, but step 335 surmises the unobserved parameters from the observed parameters using the parameter estimator of the trained convolutional neural network.

Step 336 and step 314 are similar and correspond to step 204 in FIG. 2. A difference between steps 336 and 314 is the database might contain some entries without exemplary value for the unobserved parameters at step 314, but the database is fully initialized at step 336.

Decision 337 checks whether a matching entry was found in the database. If a unique matching entry is found with a confidence score exceeding a threshold, then process 300 proceeds to step 338, which outputs the identifier of known emitter along with the confidence score. If a unique match is not found, process 300 proceeds to step 339.

At step 339, an analyst is notified of the potentially new emitter not in the database, or not uniquely identified in the database. Process 300 presents to the analyst the observed parameters and the surmised unobserved parameters, and the closest matching entries in the database along with their confidence scores. The expert analyst identifies the appropriate emitter, if possible. When the expert analyst determines the emitter is a new emitter, the expert analyst might direct process 300 to return to step 316 to potentially add the new emitter to the database and update the database at steps 330, 331, and 332 before returning to the real-time of receiving and identifying electromagnetic signals beginning at step 333.

From the above description of the Emitter Identification through Unobserved Parameters, it is manifest that various techniques may be used for implementing the concepts of apparatus 100 and methods 200 and 300 without departing from the scope of the claims. The described embodiments are to be considered in all respects as illustrative and not restrictive. The apparatus/method disclosed herein may be practiced in the absence of any element that is not specifically claimed and/or disclosed herein. It should also be understood that apparatus 100 or method 200 or 300 is not limited to the particular embodiments described herein, but is capable of many embodiments without departing from the scope of the claims.

We claim:

1. An apparatus for identifying emitters comprising:
   a receiver for receiving an electromagnetic signal from an emitter of the emitters and for measuring a plurality of respective actual values of a plurality of observed parameters of the electromagnetic signal;
   a parameter estimator for surmising, from the respective actual values of the observed parameters of the electromagnetic signal, a plurality of respective surmised values of a plurality of unobserved parameters, wherein the respective actual values of the observed parameters and the respective surmised values of the unobserved parameters characterize the emitter;
   a database for storing one or more entries for each one of the emitters, wherein each of the entries specifies an identifier of the one of the emitters and specifies a plurality of exemplary values of the observed and unobserved parameters that characterize the one of the emitters; and
   a correlator for matching the respective actual values of the observed parameters and the respective surmised values of the unobserved parameters with the exemplary values of one of the entries of the emitter from which the receiver receives the electromagnetic signal, wherein the correlator outputs the identifier from the one of the entries in the database.

2. The apparatus of claim 1 for identifying the emitters, which are radar emitters and include the emitter emitting the electromagnetic signal that is a radio frequency signal.

3. The apparatus of claim 2, wherein the identifier specified in each of the entries in the databases specifies a manufacturing origin, a model type, and optionally a serial number of one of the radar emitters.

4. The apparatus of claim 1, wherein the correlator also outputs a confidence score that specifies a likelihood that the identifier properly identified the emitter.

5. The apparatus of claim 1, wherein the correlator is for matching the respective surmised values of the unobserved parameters with the exemplary values of one or more candidates from the entries in the database, and then matching the respective actual values of the observed parameters with the exemplary values of one of the candidates for the emitter from which the receiver receives the electromagnetic signal.

6. The apparatus of claim 5, wherein the correlator also outputs a confidence score that specifies a likelihood that the identifier properly identifies the emitter, the confidence score giving relatively more weight to a degree of the matching of the unobserved parameters and relatively less weight to a degree of the matching of the observed parameters.

7. The apparatus of claim 1, wherein the observed parameters of the electromagnetic signal consist of a pulse repetition interval of the electromagnetic signal, a pulse width of the electromagnetic signal, a frequency of the electromagnetic signal, and a scan period of the electromagnetic signal.

8. The apparatus of claim 1, wherein each of the observed parameters of the electromagnetic signal is selected from the group consisting of a pulse repetition interval of the electromagnetic signal, a pulse width of the electromagnetic signal, a frequency of the electromagnetic signal, and a scan period of the electromagnetic signal.

9. The apparatus of claim 1, wherein the unobserved parameters of the electromagnetic signal consist of a period of at least one clock of the emitter of the electromagnetic signal, a set of countdowns for the clock of the emitter of the electromagnetic signal, a crystal frequency for generating the clock of the emitter of the electromagnetic signal, a channel spacing of the electromagnetic signal, a set of channel multipliers of the electromagnetic signal, and optionally an operating mode for the emitter of the electromagnetic signal.

10. The apparatus of claim 1, wherein each of the unobserved parameters of the electromagnetic signal is selected from the group consisting of a period of at least one clock of the emitter of the electromagnetic signal, a set of countdowns for the clock of the emitter of the electromagnetic signal, a crystal frequency for generating the clock of the emitter of the electromagnetic signal, a channel spacing of the electromagnetic signal, a set of channel multipliers of the electromagnetic signal, and an operating mode for the emitter of the electromagnetic signal.

11. The apparatus of claim 1, wherein the parameter estimator is for surmising the respective surmised values for the unobserved parameters, from one of the respective actual values this is a plurality of temporal values, of one the observed parameters that is a pulse repetition interval of the electromagnetic signal.

12. The apparatus of claim 11, wherein the unobserved parameters include a period of at least one clock of the emitter of the electromagnetic signal, a set of countdowns for the clock of the emitter of the electromagnetic signal, a crystal frequency for generating the clock of the emitter of the electromagnetic signal, a channel spacing of the electromagnetic signal, a set of channel multipliers of the electromagnetic signal, and an operating mode for the emitter of the electromagnetic signal.

13. The apparatus of claim 11, wherein the parameter estimator extracts basic relationships among the temporal values of the pulse repetition interval and the respective surmised values for the unobserved parameters.

14. The apparatus of claim 13, wherein the parameter estimator is further for initializing the database sequentially from respective representative signals for the emitters, wherein the receiver and/or other receivers are for receiving the respective representative signals from the emitters.

15. The apparatus of claim 1, wherein the parameter estimator includes a machine learning system trained to surmise the respective surmised values of the unobserved parameters from the respective actual values of the observed parameters of the electromagnetic signal.

16. The apparatus of claim 15, wherein the machine learning system is a convolutional neural network so trained with labeled training data that includes, for each of the emitters, a plurality of observed values of the observed parameters labeled with a plurality of unobserved values of the unobserved parameters, the observed values of the observed parameters measured from a respective representative signal emitted from each of the emitters.

17. The apparatus of claim 16, wherein the unobserved values for the unobserved parameters for each one of the emitters are extracted from basic relationships among the observed values of the observed parameters and the unobserved values for the unobserved parameters for the one of the emitters.

18. The apparatus of claim 16, comprising:
the database further for storing at least one partially-defined entry, wherein the partially-defined entry specifies an identifier of a certain one of the emitters and a plurality of detected values of the observed parameters, but does not initially specify a plurality of impending values of the unobserved parameters; and
the machine learning system of the parameter estimator for surmising the impending values of the unobserved parameters from the detected values of the observed parameters, and for initializing the partially-defined entry of the database with the impending values surmised by the machine learning system, wherein the detected values of the observed parameters and the impending values of the unobserved parameters characterize the certain one of the emitters.

19. A method for identifying emitters comprising:
receiving an electromagnetic signal from an emitter of the emitters and measuring a plurality of respective actual values of a plurality of observed parameters of the electromagnetic signal;
surmising, from the respective actual values of the observed parameters of the electromagnetic signal, a plurality of respective surmised values of a plurality of unobserved parameters, wherein the respective actual values of the observed parameters and the respective surmised values of the unobserved parameters characterize the emitter;
storing one or more entries for each one of the emitters in a database, wherein each of the entries specifies an identifier of the one of the emitters and specifies exemplary values of the observed and unobserved parameters that characterize the one of the emitters;
matching the respective actual values of the observed parameters and the respective surmised values of the unobserved parameters with the exemplary values of one of the entries of the emitter from which the electromagnetic signal is received during the receiving; and
outputting the identifier from the one of the entries in the database.

20. An apparatus for identifying emitters comprising:
means for receiving an electromagnetic signal from an emitter of the emitters and measuring a plurality of respective actual values of a plurality of observed parameters of the electromagnetic signal;
means for surmising, from the respective actual values of the observed parameters of the electromagnetic signal, a plurality of respective surmised values of a plurality of unobserved parameters, wherein the respective actual values of the observed parameters and the respective surmised values of the unobserved parameters characterize the emitter;

means for storing one or more entries for each one of the emitters, wherein each of the entries specifies an identifier of the one of the emitters and specifies exemplary values of the observed and unobserved parameters that characterize the one of the emitters; and means for matching the respective actual values of the observed parameters and the respective surmised values of the unobserved parameters with the exemplary values of one of the entries of the emitter from which the means for receiving receives the electromagnetic signal.

\* \* \* \* \*